March 21, 1933.   M. M. CLAYTON   1,901,897
ELBOW FITTING FOR ELECTRICAL SYSTEMS
Filed March 11, 1931   2 Sheets-Sheet 1
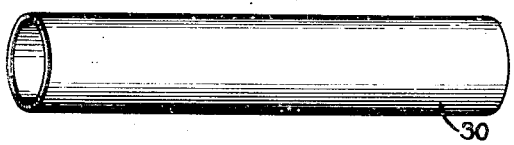
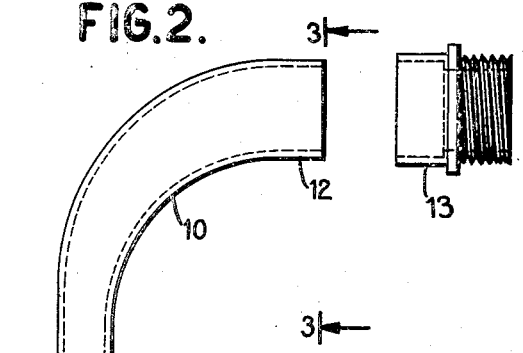
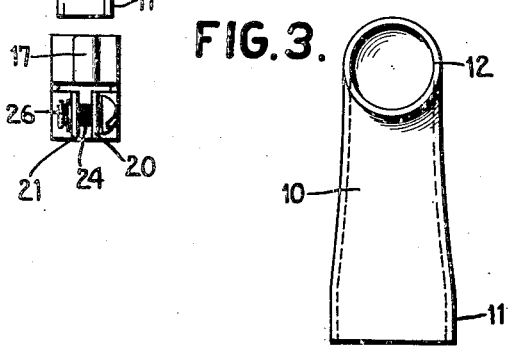
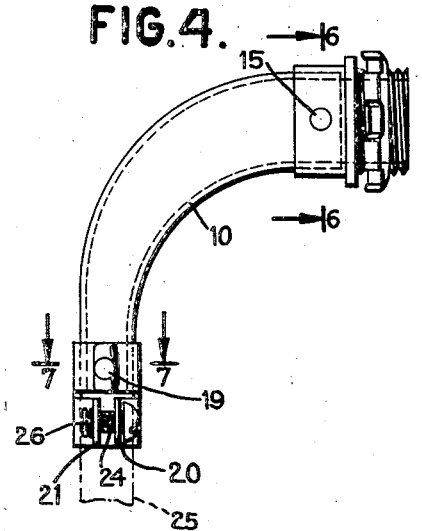
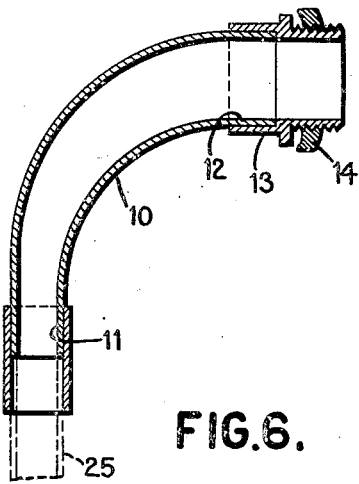
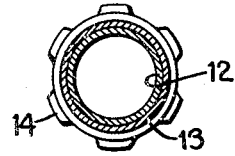
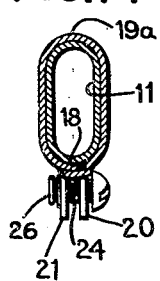
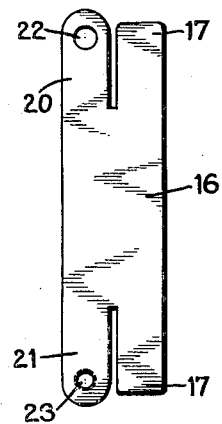
INVENTOR
Martin M. Clayton
BY his ATTORNEYS
Cooper, Kerr & Dunham March 21, 1933.  M. M. CLAYTON  1,901,897
ELBOW FITTING FOR ELECTRICAL SYSTEMS
Filed March 11, 1931  2 Sheets-Sheet 2
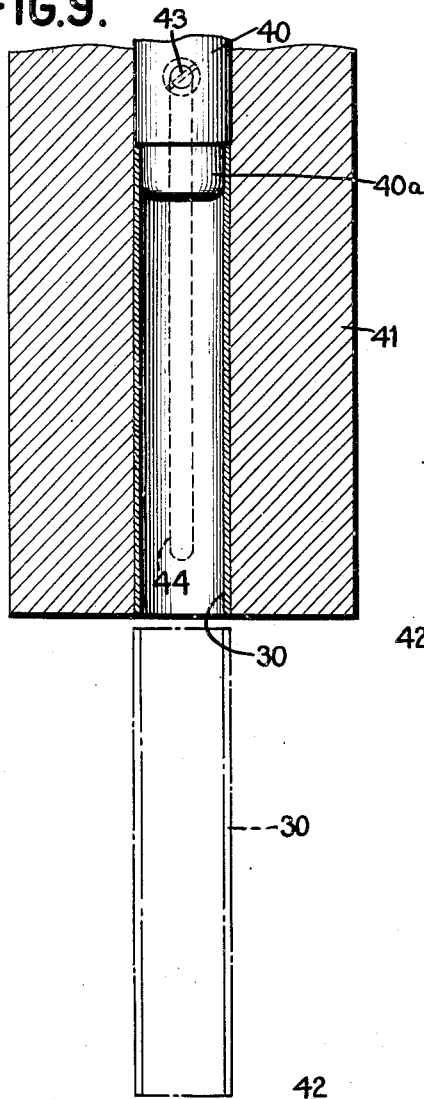
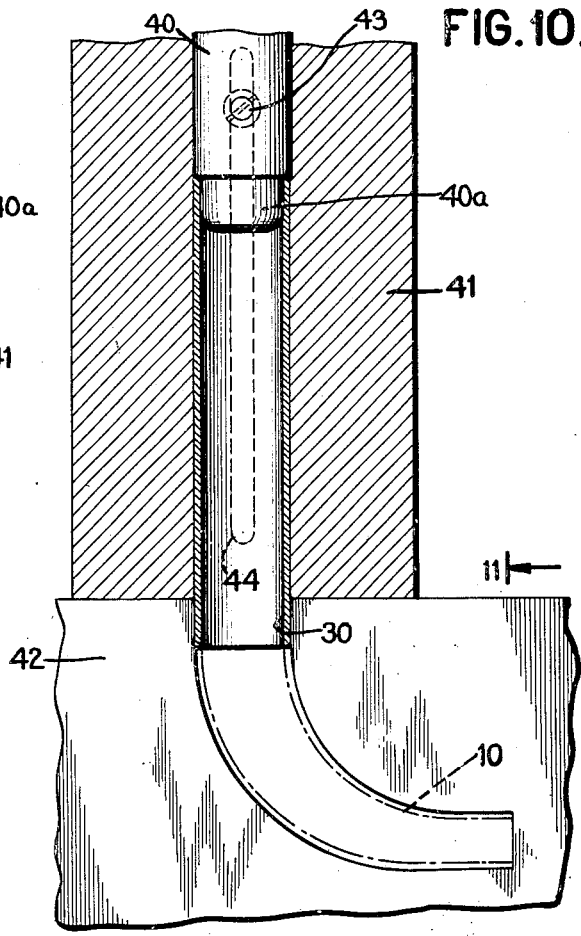
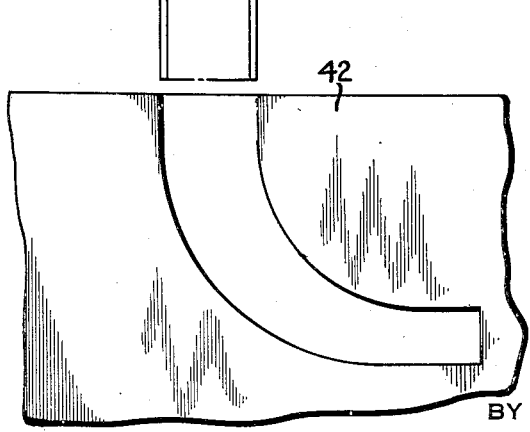
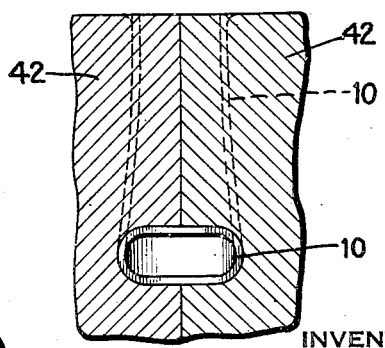
INVENTOR
Martin M. Clayton
BY his ATTORNEYS
Cooper, Kerr & Dunham Patented Mar. 21, 1933

1,901,897

UNITED STATES PATENT OFFICE

MARTIN M. CLAYTON, OF BADEN, PENNSYLVANIA, ASSIGNOR TO NATIONAL ELECTRIC PRODUCTS CORPORATION, OF NEW YORK, N. Y., A CORPORATION OF DELAWARE

ELBOW FITTING FOR ELECTRICAL SYSTEMS

Application filed March 11, 1931. Serial No. 521,751.

This invention relates to improvements in elbows adapted to connect oval tubing to round openings in outlet boxes. In electrical wiring systems oval shaped tubing is frequently used because its height is less than that of round tubing and accordingly it may be covered with plaster of normal thickness or if laid upon the surface of a wall such oval tubing will be less conspicuous than the usual round tubing.

In order to connect such oval tubings to outlet boxes of standard type, it is frequently necessary to provide means for connecting the oval shaped tubing to round openings in the boxes and to make the connections through substantially a 90 degree angle. Heretofore this has generally been done by employing an elbow which connects to the oval tubing at one end and which at the other end connects to an adaptor connector having suitable configuration to fit the round openings in the outlet box. Such a construction is relatively costly to assemble and provides a restricted wire space in the elbow which makes it difficult to fish wires through the parts. Heretofore, it has also been proposed to utilize a cast elbow wherein the adaptor is integrally cast on one end of the elbow. This fitting offers a rough interior of restricted area through which wires must be fished and the end of the fitting to which the oval tubing is connected is necessarily rather large so that the overall height of the fitting is too great to allow it to be covered with ordinary plaster. Another objection to this cast elbow construction is that an abutment was present where the tube enters the elbow and such abutment provided an opening of less area than the tube in order to properly bush the tube when it is in place.

The present invention has for its object the provision of an elbow assembly of novel configuration and having a gradual change in shape from a round cross-section at one end to an oval cross-sectional configuration at the other end.

A further object of the invention resides in the provision of an elbow which is of such construction that it may be made of relatively thin sheet metal or thin tubing, thus providing a smooth interior.

A further object of the present invention resides in the provision of an elbow fitting assembly with a round connector at one end with an elbow connector at the other and with the intermediate bent elbow portion gradually changing from oval shape in cross-section at one end to a round shape in cross-section at the other.

A further object of the present invention is to provide an elbow adapted for connection with an oval tubing with a connecting means which does not restrict the area of the oval tube where it connects to the elbow and which connecting fitting is of a minimum thickness.

A further object of the present invention resides in the provision of an elbow fitting which has a round cross-section at the other end and wherein the cross-section intermediate the round end and the oval end gradually changes from round to oval and in which the perimeter of cross-section is substantially constant at all points intermediate the round end and the oval end.

A further object of the present invention resides in the provision of a novel method for making such elbow fittings.

Further and other objects of the invention will be hereinafter set forth in the accompanying specification and claims and shown in the drawings which by way of illustration show what I now consider to be preferred embodiments of the invention.

In the drawings:

Figure 1 shows a perspective view of the straight tubing blank which is used for making the elbow shaped fitting;

Fig. 2 shows an elevational view of my improved elbow fitting with the end connector fittings spaced therefrom before being assembled for the elbow fitting;

Fig. 3 is a side elevational view of the elbow fitting proper, the view being taken substantially on line 3—3 of Fig. 2; this view shows the flare toward the oval end of the elbow fitting;

Fig. 4 is a view similar to Fig. 2 but with the end fittings in place and secured to the elbow portion of the fitting;

Fig. 5 is a detail transverse cross-sectional view of the assembled fitting shown in Fig. 4;

Fig. 6 is a sectional view taken substantially on lines 6—6 of Fig. 4;

Fig. 7 is a sectional view taken substantially on line 7—7 of Fig. 4;

Fig. 8 is a view of the sheet metal blank which is used in making up the oval end connection; and Figs. 9, 10 and 11 show successive steps in the fabrication of the elbow fitting from the straight blank shown in Fig. 1.

In more detail the elbow fitting which is preferably but not essentially of sheet metal, is shown at 10 in Fig. 2. This elbow fitting has one end 11 of oval configuration in cross-section (see also Fig. 7) and its opposite end 12 is of round cross-section (see Fig. 6). The shape of the elbow is such that the oval section gradually changes to a round section and this change is made gradually throughout the bent length of the elbow. The construction is furthermore such that the perimeter in transverse cross-section is substantially the same at all points intermediate the end 11 and end 12, and in this way such that the cross-sectional area throughout is generally at least as great as that of oval-shaped end 11. By reason of this construction objectionable localized restricted portions heretofore present in fittings of this type are obviated, and ample space for the passage of wires is provided throughout the section. The round end 12 of the elbow is adapted to be connected to a round opening in an outlet box or other part by means of the usual nipple and nut fitting 13—14. Preferably the nipple fitting is secured to the elbow fitting by spot welding at opposite sides. One spot welding point being indicated at 15 and it will be understood that there is another spot welding made diametrically opposite the end of the elbow fitting to oval tubing. Preferably a sheet metal clamp is utilized which is stamped up from a sheet metal blank such as 16 in Fig. 8. This blank is formed with the end portions 17 overlapped as shown at 18 in Fig. 7 and the oval clamp may be united to the elbow 10 by spot welding as indicated at 19. Preferably spot welding is effected at 19 on the overlapped portions 18 and also diametrically opposite at point 19a as indicated in Fig. 7. End portions 20 and 21 of the blank may be respectively provided with a drilled aperture 22 and a threaded aperture 23 to receive a clamping screw 24 (see Figs. 4 & 7). Obviously by tightening up this clamping screw, the oval duct connector may be clamped to the end of an oval shaped tubing shown in dotted lines at 25 in Figs. 4 and 5. Fig. 5 shows the oval tubing 25 inserted in the connector and as shown in this figure it will be noted that there is substantially a complete absence of objectionable shoulders intermediate the inside of the tubing 25 and the inside of the elbow and further that the inside of the elbow is substantially flush with the inside of the nipple 13 at points beyond the shoulder of the nipple. Such shoulders if present, might hinder free fishing of the wire or wires. To prevent loss of the screw 24 the end 26 of the screw may be riveted over as shown in Figs. 4 and 7.

The method of making the elbow fitting from the blank 30 shown in Fig. 1 will now be described with reference to Figs. 9 to 11 inclusive.

Referring first to Fig. 9, in this figure, 40 designates a punch plunger at the extreme top stroke position, only one end of the punch is shown. Surrounding this punch is a sliding bushing 41, the bore of which makes a snug fit with the outside diameter of the blank 30. 42 represents the die member. With the punch 40 and bushing 41 in extreme upper position at the top of the stroke of the plunger the bottom of the sleeve 41 is sufficiently above the level of the die to enable the operator to slip the tubing blank 30 under the lower end of the bushing and up into the bore in the bushing (note dotted line position of blank 30 and full line position of blank 30 in sleeve 41). The punch plunger 40 and the bushing sleeve 41 are operatively connected by screw 43 operating in a slot 44 in the bushing sleeve. The punch plunger 40 and the bushing 41 is now caused to descend until the bushing 41 encounters the die 42 (see Fig. 10). There after subsequent downward movement of the plunger 40 causes the blank 30 to enter into the top of the die as is shown by the full line position of the parts. The motion of the plunger 40 then continues causing the blank 30 to be introduced further into the die until it eventually assumes the position in which it has been completely formed, which is designated at 10 on Fig. 10.

It will be understood that the lower part 40a of the plunger, which is initially within the blank 30, enters the top portion of the die 42.

As shown in Fig. 11, the die 42 is preferably a split die, made in two parts as shown. The die is so shaped that the punch pressed operation forms the elbow fitting 10 with a round end portion 12 with an oval portion 11 and with an intermediate portion between 12 and 11 which gradually changes from a round section to an oval section. This change is made gradually throughout substantially the entire bent length of the elbow intermediate the end portions 11 and 12 as will be readily understood.

The present application constitutes a continuation in part of application Serial No. 413,998 filed December 14, 1929.

The method herein disclosed is claimed in my copending application, Serial Number 560,951, filed Sept. 3d, 1931.

What I claim is:

1. A fitting for an electrical wiring system for connecting oval shaped ducts to a part having a round opening therein, said fitting comprising an elbow which gradually changes throughout its bent length from an oval section at one end to a round section at the other, and has a cross-sectional area throughout at least as great as the area of said oval section at one end.

2. A fitting for an electrical wiring system for connecting oval shaped ducts to a part having a round opening therein, said fitting comprising an elbow which throughout its bent length has a substantially constant perimeter and gradually changes from an oval section at one end to a round section at the other.

3. A fitting for an electrical wiring system for connecting oval shaped ducts to a part having a round opening therein, said fitting comprising an elbow of thin walled metallic tubing which has a substantially constant perimeter and is gradually changed in cross-section throughout its bent length from an oval shape in cross-section at one end to a round shape in cross-section at the other.

4. A fitting assembly for use in electrical wiring systems for connecting oval shaped ducts to a part having a round opening therein, said fitting comprising an elbow which has a substantially constant perimeter and gradually changes throughout its bent length from an oval cross-section at one end to a round cross-section at the other, and coupling means at each end of the elbow, one coupling means having provisions for coupling the round end of the elbow to a part having a round opening therein and the coupling upon the other end of the elbow being adapted for coupling the elbow to oval shaped tubing.

5. A fitting for use in an electrical wiring system which employs an oval tubing as a race-way for wires, said fitting comprising an elbow which gradually changes in cross-section throughout its bent length from an oval cross-section at one end to a round cross-section at the other, said oval end having the same shape, cross-section and size as the oval tubing used as the race-way, and said elbow having a cross-sectional area throughout at least as great as the cross-sectional area of said oval end.

6. A fitting for an electrical wiring system which uses an oval tubing as a wire race-way, said fitting comprising an elbow made of tubing which has an oval cross-sectional configuration at one end and which has a round cross-sectional configuration at the other and which elbow intermediate its ends gradually changes from oval to round cross-section, said elbow having throughout a substantially constant perimeter.

In testimony whereof I hereto affix my signature.

MARTIN M. CLAYTON.